United States Patent
Barlow et al.

(10) Patent No.: US 10,633,945 B2
(45) Date of Patent: Apr. 28, 2020

(54) MOLDED TOOL AND A METHOD OF MANUFACTURE

(71) Applicant: GEODYNAMICS, INC., Millsap, TX (US)

(72) Inventors: Joel L. Barlow, Fort Worth, TX (US); Joel T. Barlow, Fort Worth, TX (US); Chapman Barlow, Argyle, TX (US)

(73) Assignee: GEODYNAMICS, INC., Millsap, TX (US)

( * ) Notice: Subject to any disclaimer, the term of this patent is extended or adjusted under 35 U.S.C. 154(b) by 0 days.

(21) Appl. No.: 16/052,754

(22) Filed: Aug. 2, 2018

(65) Prior Publication Data

US 2019/0047187 A1     Feb. 14, 2019

Related U.S. Application Data (60) Provisional application No. 62/619,498, filed on Jan. 19, 2018, provisional application No. 62/543,106, filed on Aug. 9, 2017.

(51) Int. Cl.
    *E21B 33/12*      (2006.01)
    *B29C 70/44*      (2006.01)
    (Continued)

(52) U.S. Cl.
    CPC ........ *E21B 33/1208* (2013.01); *B29C 43/027* (2013.01); *B29C 43/203* (2013.01);
    (Continued)

(58) Field of Classification Search
    CPC ... E21B 33/12; E21B 33/1208; B29C 43/027; B29C 43/203; B29C 70/446; B29C 70/56; B29K 2105/0881
See application file for complete search history.

(56) References Cited

U.S. PATENT DOCUMENTS 5,525,288 A    6/1996   Ninomiya et al.
5,603,490 A    2/1997   Folsom
(Continued)

FOREIGN PATENT DOCUMENTS

WO            9220899 A1    11/1992
WO      WO-9220899 A1 * 11/1992  ............. B29C 70/04

OTHER PUBLICATIONS

International Search Report and Written Opinion dated Oct. 18, 2018 in related International Application No. PCT/US2018/044948 (reference WO 92/020899 was previously cited in an IDS on Aug. 2, 2018).

*Primary Examiner* — Caroline N Butcher
(74) *Attorney, Agent, or Firm* — Patent Portfolio Builders PLLC (57) ABSTRACT

A molded tool is formed from a compression mold material and a corresponding method of manufacture is disclosed. The molded tool has a first end, a second end separated from the first end by a sidewall formed from a heat-sensitive polymeric matrix. The sidewall has an interior surface with a first strength and an exterior surface with a second strength, the first strength being greater than the second strength. Further, the molded tool is formed by a method that includes exerting an expansive force within an interior of the compression mold material, the expansive force having a directional vector along the central axis.

11 Claims, 9 Drawing Sheets

(51) Int. Cl.
*B29C 43/02* (2006.01)
*B29C 43/20* (2006.01)
*B29C 70/56* (2006.01)
*B29K 105/08* (2006.01)

(52) U.S. Cl.
CPC .......... *B29C 70/446* (2013.01); *B29C 70/56* (2013.01); *E21B 33/12* (2013.01); *B29K 2105/0881* (2013.01)

(56) References Cited

U.S. PATENT DOCUMENTS

| | | | | |
|---|---|---|---|---|
| 6,084,052 | A * | 7/2000 | Aufdermarsh | E21B 47/011 |
| | | | | 528/125 |
| 2011/0284153 | A1* | 11/2011 | Barlow | B29C 70/085 |
| | | | | 156/191 |
| 2017/0122395 | A1* | 5/2017 | Kiele | B29C 70/30 |
| 2018/0305930 | A1* | 10/2018 | Martin | B29C 70/025 |

* cited by examiner

MOLDED TOOL AND A METHOD OF MANUFACTURE

BACKGROUND

Technical Field

Novel aspects of the present disclosure relate to a molded tool and a corresponding method of manufacture. More particularly, the present disclosure is directed to an elongated, molded tool with improved strength in the radial direction, a feature attributable to a process that utilizes an expansive force originating from within the molded tool which has a directional vector oriented in the direction of and along a central axis of the molded tool.

Background

Examples of commonly utilized tools in the well drilling industry include bridge plugs and frac plugs. These tools are formed as elongated mandrels with slips on either end. Mandrels formed from metals provided desirable hardness, tensile strength, and compressive strength. However, tool components fabricated for downhole oil and gas operations are often drilled out rather than removed. Increased time and cost is required for drilling through metallic tool components. Accordingly, composite tool components have been developed to address these issues.

Composite tools are often formed by compression molding. Conventional methods of composite molding involves the application of a compressive force on the exterior of the composite tool in an inwardly direction, normal to the surface of the tool. The resulting composite tools have structural weaknesses. In some instances, the structural weaknesses are addressed by incorporating a central core formed from metal, but at the expense of added cost and increased manufacturing complexity. And as already mentioned, increased effort is required to drill out downhole tools that have metallic components.

SUMMARY OF THE INVENTION

Novel aspects of the present invention are directed to a molded tool and a corresponding method of manufacture. In one embodiment, novel aspects are directed to a method of manufacture that includes shaping a compression mold material to form a shaped compression mold material with a central axis extending through from a first end of the shaped compression mold material to a second end. The shaped compression mold material is heated to form a heated compression mold material, and an expansive force is exerted within an interior of the heated compression mold material to form the molded tool, the expansive force including a directional vector oriented in the direction of and along the central axis.

In another embodiment, novel aspects of the present invention are directed to a molded tool. The molded tool has a first end and a second end separated from the first end by a sidewall formed from a heat-sensitive polymeric matrix. The sidewall has an interior surface with a first strength and an exterior surface with a second strength, the first strength being greater than the second strength, the strength being determined according to methods known to those having ordinary skill in the art.

Other aspects, embodiments and features of the invention will become apparent from the following detailed description of the invention when considered in conjunction with the accompanying figures. In the figures, each identical, or substantially similar component that is illustrated in various figures is represented by a single numeral or notation. For purposes of clarity, not every component is labeled in every figure. Nor is every component of each embodiment of the invention shown where illustration is not necessary to allow those of ordinary skill in the art to understand the invention.

BRIEF DESCRIPTION OF THE FIGURES

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying figures, wherein:

DETAILED DESCRIPTION

Some composite tools formed for downhole drilling operations have structural artifacts that reduce the strength and integrity of the tool, increasing the likelihood of failure. The structural artifacts, which are caused by conventional compression molding techniques, include irregular, wadded interfaces between each layer of the composite material, and layers that only partially wrap around a central core of the composite tool. Examples of these structural artifacts are shown in more detail in FIGS. 1a-1c.

Figure 1A:
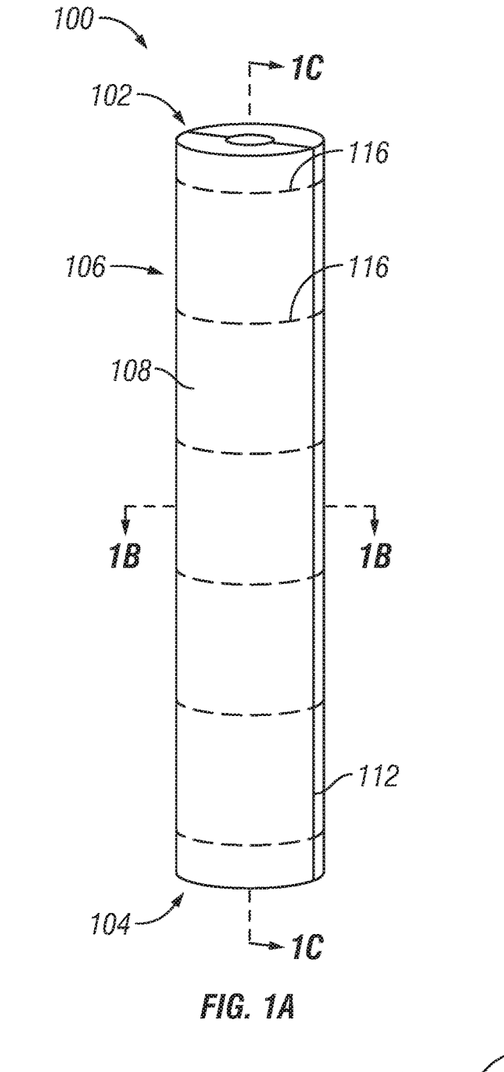
FIGS. 1a-1c depict an example of a prior art composite molded tool formed from conventional compression molding techniques.

FIG. 1a is a perspective view of a composite tool formed from conventional compression molding techniques. The composite molded tool 100 is a mandrel having a generally hollow, cylindrical shape with a first end 102 separated from a second end 104 by a sidewall 106. The sidewall 106 has an exterior surface 108 and a corresponding interior surface 110 that defines a hollow core, which in this illustrative example is a central channel 111 extending from the first end 102 of the molded tool 100 to the second end 104. The exemplary molded tool 100 of FIG. 1 has a part line 112 extending down a length of the exterior surface 108 of the sidewall 106, passing through the sidewall 106, as can be seen in more detail in FIG. 1b. The part line 112 is formed during the molding process when the composite material is exposed to heat and external pressure that forces the excess composite material out of the mold as flashing. One method of forming the composite molded tool 100 is described in more detail in WO 92/20899.

Generally, the molded tool 100 is formed by molding sheets of composite mold material around a removable core, which forms a plurality of layers 114. The plurality of layers 114 is evident from the cross-sectional view of the composite molded tool 100 shown in FIG. 1b, which is the cross-sectional view taken along line 1b in FIG. 1a. As can be seen with reference to FIG. 1b, the sidewall 106 is formed from two parts, sidewall 106a and sidewall 106b, which meet at the part line 112 that extends through the sidewall 106 and down a length of the molded tool 100 between two adjacent layers 114. Noticeably, each of the layers 114 that only wrap partially around the central channel 111 with ends that extend toward and terminate at a part line 112 on opposite sides of the sidewall 106.

Figure 1B:
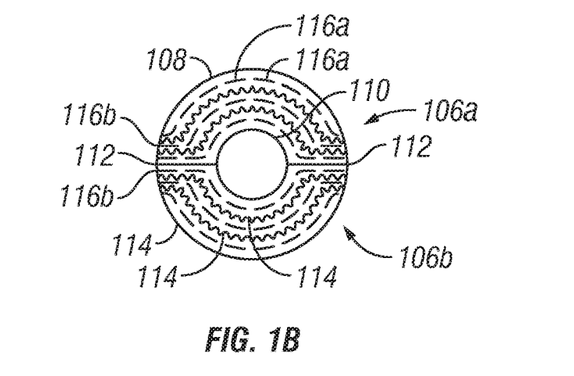

Sheets of compression mold material used to form the individual layers 114 of the sidewall 106 are typically comprised of a polymer with a plurality of fibers 116 embedded therein. In this example, the plurality of fibers 116 are oriented uni-directionally and as can be seen, only a portion of the fibers 116a wrap circumferentially around the central channel 111 with the remaining fibers 116b oriented radially outward. The dual orientation of fibers is caused when excess compression mold material is forced out of the compression mold when the external compressive force is applied. Conventional compression molding methods that seal the plurality of layers 114 together pre-loads the fibers 116 with a compressive force in a manner that is known in the art. However, the external compressive force directed inwardly produces an irregular, wadded interface between each of the layers 114 in the sidewall 106.

Figure 1C:
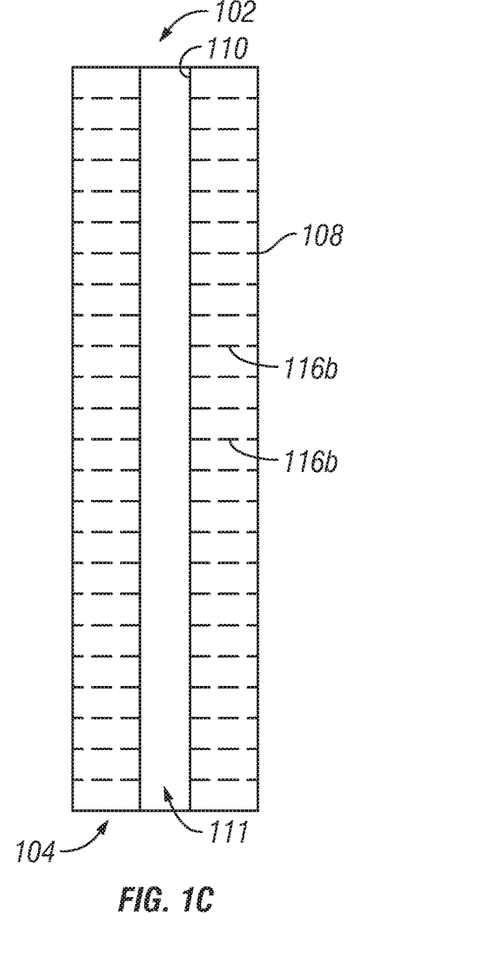

The molded tool 100 depicted in FIGS. 1a-1c is undesirable because the molded tool 100 is more likely to separate and fail at the part line 112, and because the part line 112 provides an undesirable leak path for liquids in tools implemented as plugging elements. Additionally, the wadded interface between the layers 114 of the sidewall 106 reduces the strength of the sidewall 106 by allowing for separation between the layers 114 in the presence of a force directed in the outwardly radial direction, rather than allowing the plurality of fibers 116 to absorb and dissipate the force.

FIG. 1c is a cross-sectional view of the molded tool 100 taken along line 1c in FIG. 1a. The line 1c splits the sidewall 106 into two parts 106a and 106b along the part line 112, exposing the central channel 111 and the innermost layer of the plurality of layers 114. As can be seen, the innermost layer is shaped with an arcuate central portion coinciding with the curvature of the central channel 111, and generally planar portions on either sides of the central channel 111 which terminate at the part lines 112. Consequently, the portion of the fibers 116b embedded in the corresponding layer of the plurality of layers 114 have some fibers 116b oriented radially from the central channel in the direction of the part lines 112 rather than circumferentially around the central channel 111. The radially-oriented fibers 116b are ill-suited for opposing a compressive force originating within the central channel 111 which are directed radially outward.

Novel aspects of the present invention address the deficiencies of the molded tool 100 formed by conventional molding techniques, and provide for an improved molded tool and a corresponding method of manufacture. The improved tool disclosed herein have layers that wrap entirely around a central core and at least a few layers with a more regular interlayer interfaces.

Figure 2A:
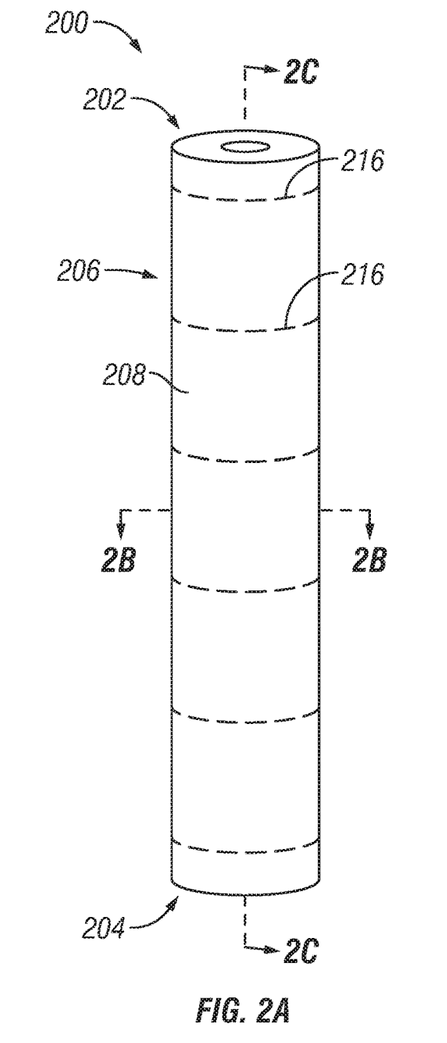
FIG. 2a-2c depict a composite molded tool in accordance with an illustrative embodiment and formed by the methods described herein.

FIG. 2 depicts a composite molded tool in accordance with an illustrative embodiment. The molded tool 200 can be used in downhole drilling operations as a mandrel in a frac plug or a drain plug. More specifically, FIG. 2a is a perspective view of a composite tool formed from the novel molding techniques described herein. The molded tool 200 has a cylindrical shape with a first end 202 separated from a second end 204 by a sidewall 206. The sidewall 206 has an exterior surface 208 and a corresponding interior surface 210 that defines a central channel 211 extending from the first end 202 of the molded tool 200 to the second end 204. As will be described in more detail below, one or more of the various embodiments of the molded tool 200 can have a superficial part line (not shown) located only on the exterior surface 208 of the sidewall 206, which would have no effect on the strength and integrity of the molded tool 200.

Figure 2B:
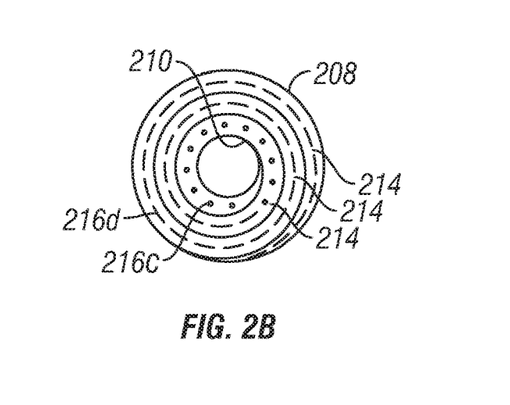

The molded tool 200 has a plurality of layers 214, each of which wraps around the central channel 211, as can be seen in the cross-sectional view of FIG. 2b taken along line 2b in FIG. 2a. Further, in this non-limiting embodiment, the plurality of layers 214 is formed from a single sheet of compression mold material rolled into a cylindrical shape, as can be seen in more detail in FIG. 3 that follows. However, in another embodiment, the molded tool 200 may be formed from two or more sheets of a compression mold material and wrapped to form the cylindrical shape. In either event, each of the plurality of layers 214 optionally includes a plurality of embedded fibers 216.

In one embodiment, during formation the inner diameter of the molded tool 200 is expanded from the inside by an expansion member that exerts an expansive force that includes a compressive component and a shear component. The compressive force is exerted against the inside surface, which has a directional vector oriented radially outward. The expansion member also exerts a shear force against the inside surface, which has a directional vector oriented in the direction of and along the central axis 213 of the molded tool 200. The shear force exerted upon the interior of the molded tool 200 realigns at least some of the fibers 216 within the sidewall 206 in the direction of the central axis 213, pre-loading the fibers 216c in one or more of the plurality of layers 214 with tension. In some embodiments, certain of the fibers 216d are also pre-loaded with compression as a result of the compressive force oriented radially outward from the expansion member. Layers 214 having fibers pre-loaded with tension, and optionally also pre-loaded with compression, are stronger than layers 214 with fibers 216d only pre-loaded with compression. The resulting molded tool 200 has an interior surface 210 with a greater strength than the exterior surface 208.

Figure 2C:
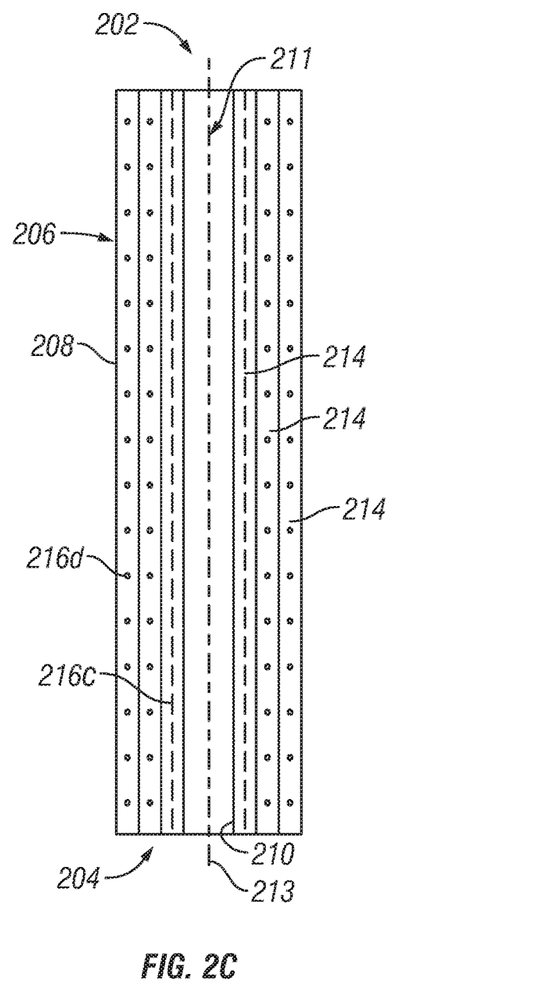

In FIG. 2b, the fibers 216 aligned with the central axis 213 projected out of the page and are depicted as circles and fibers 216 aligned circumferentially around the central axis 213 are depicted as dashed lines. Similarly, in FIG. 2c, the fibers 216 aligned with the central axis 213 are depicted as dashed lines and fibers 216 aligned circumferentially around the central axis 213 project out of the page and are depicted as circles.

Figure 3A:
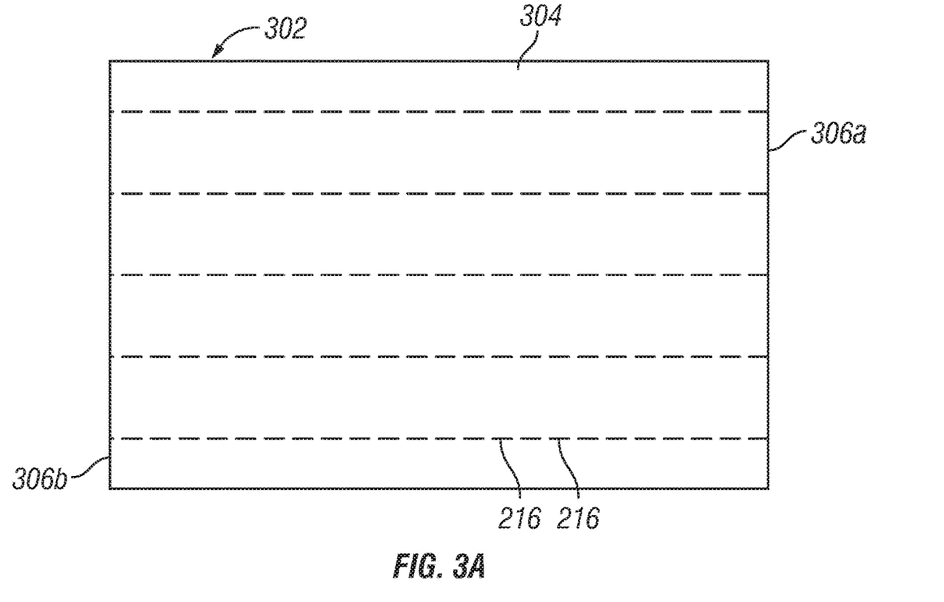
FIGS. 3a-3c illustrate the formation of a shaped compression mold material in accordance with an illustrative embodiment.
Figure 3B:
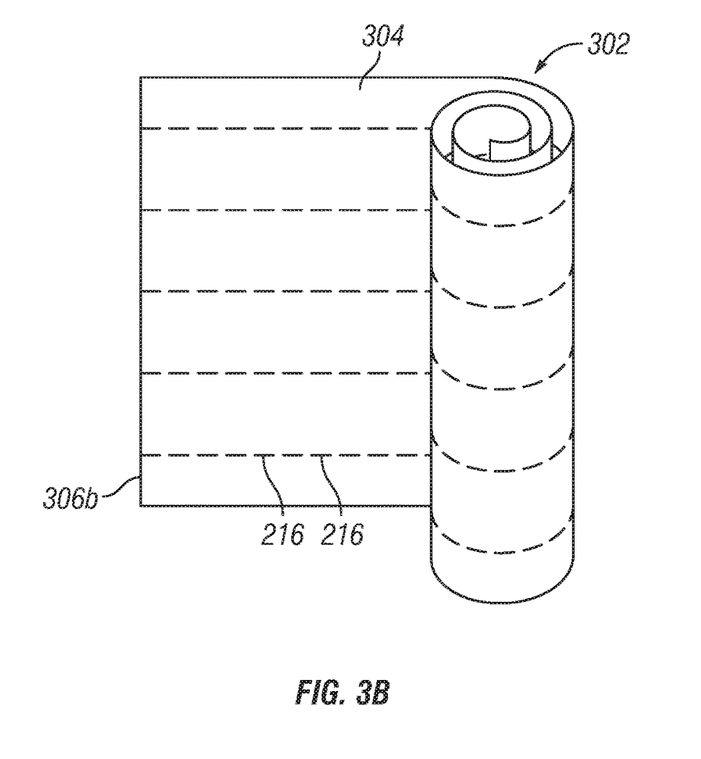
Figure 3C:
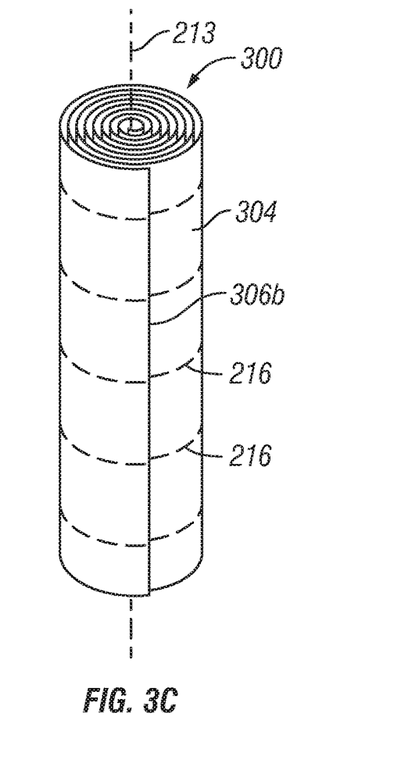

FIGS. 3a-3c illustrate the formation of a shaped compression mold material in accordance with an illustrative embodiment. The shaped compression mold material 300 shown in FIG. 3c is formed from one or more sheets of compression mold material 302 depicted in FIG. 3a. The compression mold material is formed from a polymeric matrix 304, which may be a thermoset polymer or a thermoplastic polymer. Non-limiting examples of the polymeric matrix includes nylon, epoxy, phenolic resin, polyphenylene sulfide, polyether ether ketone, or combinations thereof.

The polymeric matrix 304 depicted in FIG. 3a includes a plurality of fibers 216 embedded therein. The fibers 216 increase the strength of the polymeric matrix 304 as is already known in the art. In this non-limiting embodiment, the fibers 216 are oriented uni-directionally from left to right; however, in other embodiments the fibers 216 may be oriented differently. For example, the fibers 216 may be oriented bi-directionally in a cross-fiber orientation. Alternatively, the plurality of fibers 216 may be randomly oriented within the polymeric matrix 304.

FIG. 3b depicts the intermediate form of the shaped compression mold material 300 as the sheet of compression mold material 302 is rolled into a generally cylindrical shape. One longitudinal edge 306a of the sheet of compression mold material 302, which corresponds to a length of the finished molded tool, is rolled in a direction of the opposite longitudinal edge 306b, forming the generally cylindrical shape of the shaped compression mold material 300 in FIG. 3c, which approximates the shape of the molded tool 200 shown in FIG. 2. Additionally, the shaped compression mold material 300 has a central axis 213 passing longitudinally through its center, which is identified to facilitate the description of subsequent processing steps.

Rolling the sheet of compression mold material 302 tightly can form a shaped compression mold material 300 that is substantially solid. However, subsequent molding steps of a substantially solid cylinder results in increased amounts of wasted compression mold material and potentially more difficult molding steps, particularly when an expansion member is forced through the shaped compression mold material 300 along the central axis 213. Thus, in another embodiment, the rolling of the sheet of compression mold material 302 may be initiated by defining a cylindrical-shaped void in the center of the shaped compression mold material 300, and then rolled tightly so that the concentric layers form a substantially solid sidewall. The cylindrical-shaped void can reduce the amount of excess compression mold material that is wasted, and can also serve as a pilot hole that facilitates the introduction of an expansion member through the shaped compression mold material 300 along the central axis 213.

With reference to FIG. 3c, the plurality of fibers 216 are oriented circumferentially around the central axis 213, and the sheet of compression mold material 302 is rolled to define a cylindrically-shaped void through its center, which can be seen in more detail in FIG. 6c below. Once formed, the shaped compression mold material 300 can be molded in a compression mold to form the improved molded tool 200 shown in FIG. 2. Non-limiting examples of the compression mold for forming the molded tool 200 are shown below in FIGS. 4 and 5.

In the illustrative embodiment disclosed in FIGS. 3a-3c, the shaped compression mold material 300 is formed from a single sheet of compression mold material 302 with longitudinal edges 306 having a length that correspond with a length of the molded tool 200, and a width sufficient to form the shaped compression mold material 300 with a desired density of layers 214. However, in an alternate embodiment, the sheet of compression mold material 302 may be two or more sheets of compression mold material 302, the first sheet of the compression mold material 302 wrapped as can be seen in FIGS. 3b and 3c, and each subsequent sheet of compression mold material 302 wrapped around the outer surface of the first sheet to form additional external layers 214. The two or more sheets of compression mold material 302 may be identical so that the size, composition of the polymeric matrix 304, and fiber 216 orientation are the same. In another embodiment, each sheet of the compression mold material 302 may differ in some material aspect, such as composition of the polymeric matrix 304 or fiber 216 orientation so that different structural properties may be achieved. For example, alternating sheets of compression mold material 302 with different fiber orientations may result in improved strength.

Figure 4:
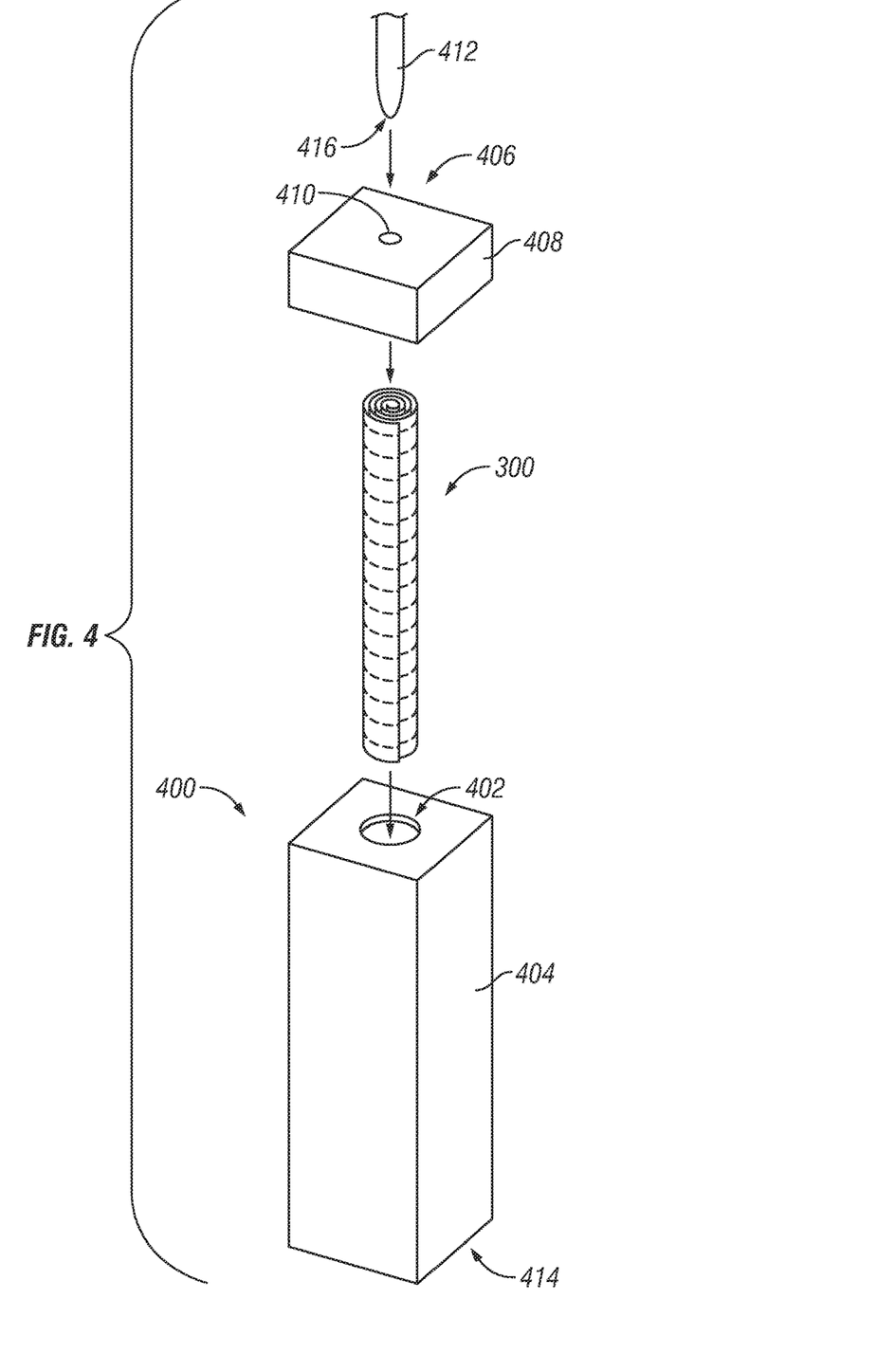
FIG. 4 is an exemplary configuration of a compression mold for forming the molded tool in accordance with an illustrative embodiment.

FIG. 4 is an exemplary configuration of a compression mold for forming the molded tool in accordance with an illustrative embodiment. The compression mold 400 is a device with an elongated cavity 402 recessed within a housing 404. The elongated cavity 402 is sized and shaped to form a molded tool 200 with the desired exterior dimensions. The compression mold 400 may be oriented vertically as shown so that sealing the shaped compression mold material 300 within the cavity 402 orients the central axis 213 in the direction of the gravitational force vector. Alternatively, the compression mold 400 may be oriented horizontally so that the central axis 213 of the shaped compression mold material 300 is oriented perpendicularly to the gravitational force vector. In addition, the housing 404 may be sealed on a first end 406 by an endcap 408 having an aperture 410 sized to receive an expansion member 412. In an alternate embodiment, the compression mold 400 may be formed without an endcap 408 but instead from a housing 404 separated into two portions or halves, resulting a superficial part line on the exterior surface 208 of the finished molded tool 200. In either event, both the first end 406 and the second end 414 of the compression mold 400 has an aperture 410 aligned with the central axis 213 to allow an expansion member 412 to pass entirely through the compression mold 400 along the central axis 213.

In this illustrative embodiment of FIG. 4, a shaped compression mold material 300 is inserted into the cavity 402. Thereafter the compression mold 400 is sealed by sealing the endcap 408 against the housing 404. The shaped compression mold material 300 is subjected to a heat treatment according to conventional methods to soften the polymeric matrix 304 and facilitate interlayer bonding. An expansion member 412 is introduced into the aperture 410 in the endcap 408 and along the central axis 213 at least partially through the heated compression mold material to expand the inner diameter of the heated compression mold material.

In this illustrative example, the expansion member 412 is an elongated bullet-nosed rod with a diameter selected to achieve the desired dimensions of the interior surface 210 of the finished molded tool 200. The distal end 416 of the bullet-nosed rod is depicted as a rounded conical shape; however, the form of the expansion member 412 is exemplary and should not be deemed as limiting.

In one embodiment, the expansion member 412 is forced through the entire length of the compression mold 400 so that at least a portion of the expansion member 412 extends out from the second end 414 of the compression mold 400 through the aperture 410 on the second end 414. Excess compression mold material can be forced out of the aperture 410 on the second side of the compression mold 400, eliminating the longitudinal flashing that is generated by conventional compression molding techniques that only utilize an external compressive force. In another embodiment, the expansion member 412 may comprise two opposing expansion members 412, each of which is introduced into opposite ends of the compression mold 400 until contact is made by the distal ends 416 within the heated compression mold material.

Figure 5:
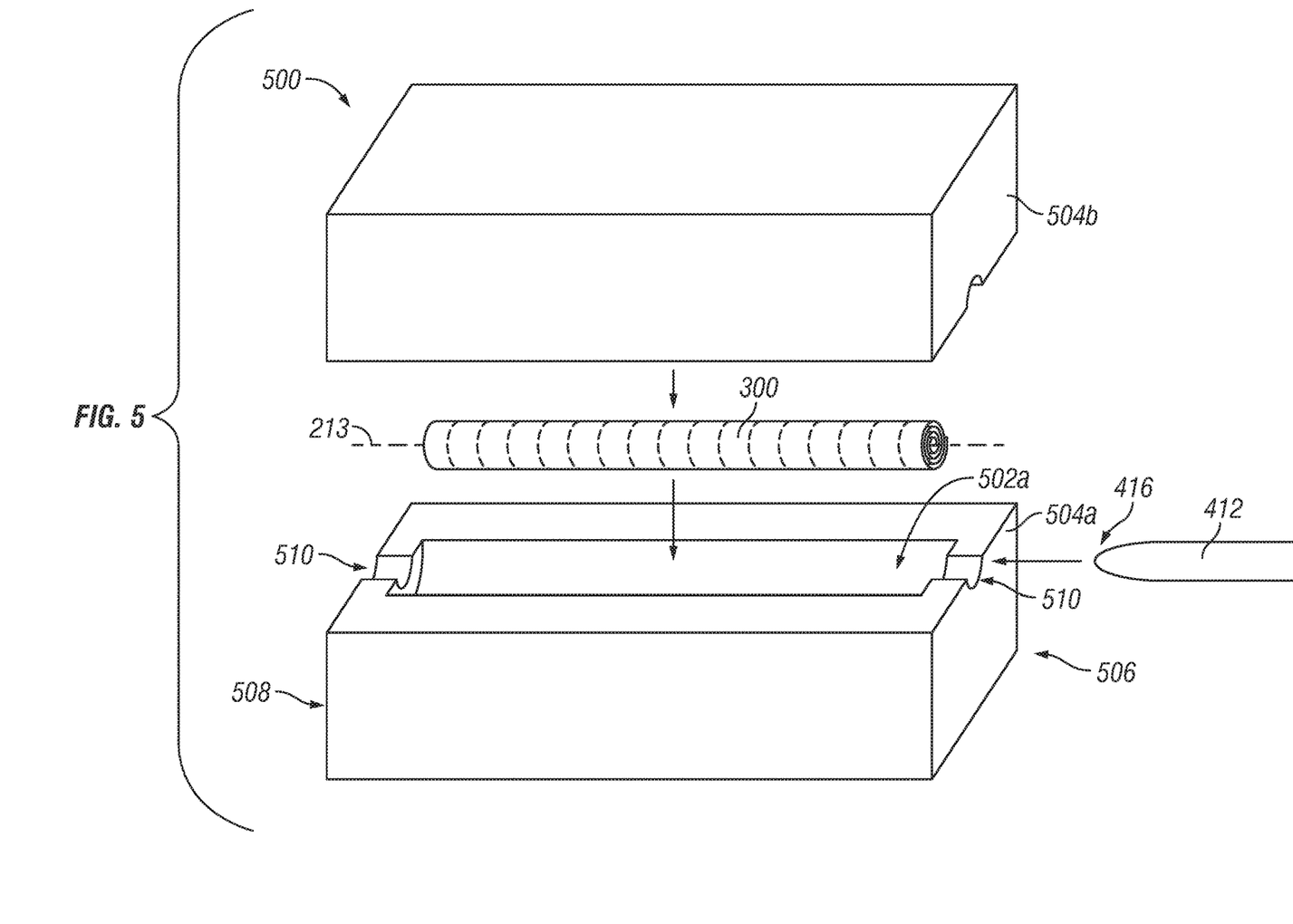
FIG. 5 is an exemplary configuration of another compression mold for forming the molded tool in accordance with an illustrative embodiment.

FIG. 5 is an exemplary configuration of another compression mold for forming the molded tool 200 in accordance with an illustrative embodiment. The compression mold 500 is a device with an elongated channel 502*a* recessed within a first housing portion 504*a*, and a similarly formed elongated channel recessed within a second housing portion 504*b*. The two halves of the housing 504 can be coupled together to seal the compression mold material 300 within the resultant cavity formed by the two coinciding channels 502. Formation of a molded tool 200 using the compression mold 500 may result in a superficial part line on the exterior surface 208 of the molded tool 200.

The compression mold 500 may be oriented horizontally as shown so that sealing the shaped compression mold material 300 within the cavity 402 will result in the central axis 213 of the shaped compression mold material 300 oriented perpendicularly to the gravitational force vector. Alternatively, the compression mold 500 may be oriented vertically with the central axis 213 of the shaped compression mold material 300 in the direction of the gravitational force vector. In either event, the compression mold 500 has a first end 506 and an opposite second end 508. The first end 506 has an aperture 510 sized to receive an expansion member 412, and the second end 508 has a similarly sized aperture 510, both of which are aligned with the central axis 213 to allow an expansion member 412 to pass entirely through the compression mold 500 and through a shaped compression mold material 300 housed within.

In this illustrative embodiment of FIG. 5, a shaped compression mold material 300 is placed into the channel 502, which is dimensioned so that the finished molded tool 200 has the desired form factor. Thereafter the compression mold 500 is sealed by sealing the first housing portion 504*a* against the second housing portion 504*b*. The shaped compression mold material 300 is subjected to a heat treatment to soften the polymeric matrix 304 and facilitate interlayer bonding. An expansion member 412 is introduced into the aperture 510 in the first end 506 and along the central axis 213 at least partially through the heated compression mold material.

In one embodiment, the expansion member 412 is forced through the entire length of the compression mold 500 so that at least a portion of the expansion member 412 extends out from the second end 508 of the compression mold 500 through the aperture 510 on the second end 508. Excess compression mold material can be forced out of the aperture 510 on the second end 508 of the compression mold 500, eliminating the flashing that is generated by conventional compression molding techniques. In another embodiment, the expansion member 412 may comprise two opposing expansion members 412, each of which is introduced into opposite ends of the compression mold 500 through a corresponding aperture and extended until contact is made by the distal ends 416 within the heated compression mold material.

Figure 6A:
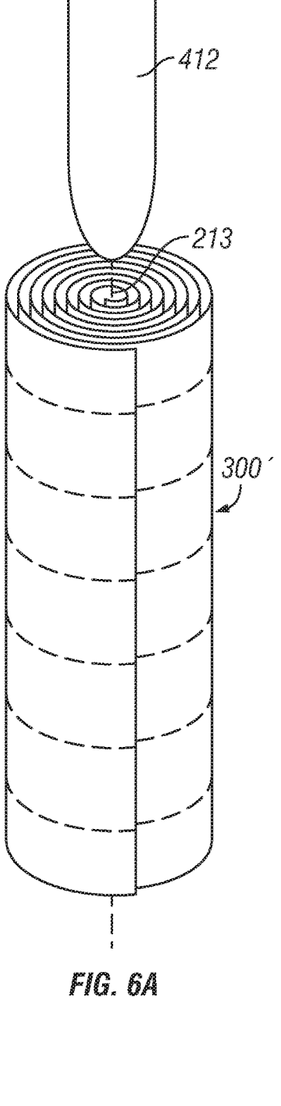
FIGS. 6a-6c illustrates the forces acting on a heated compression mold material in accordance with an illustrative embodiment.
Figure 6B:
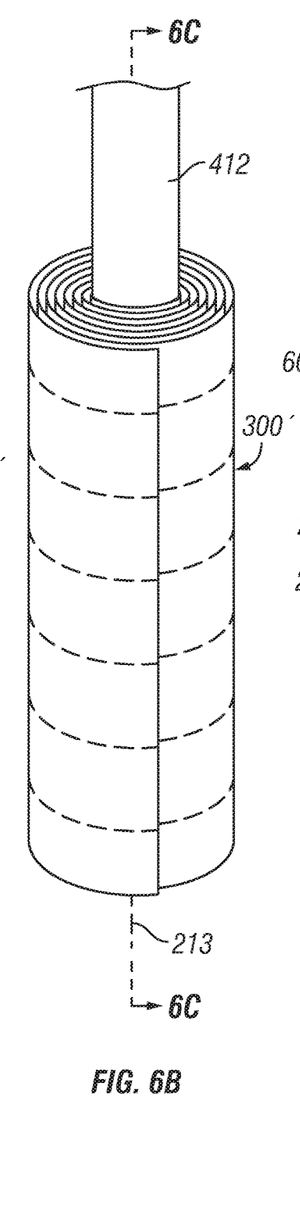
Figure 6C:
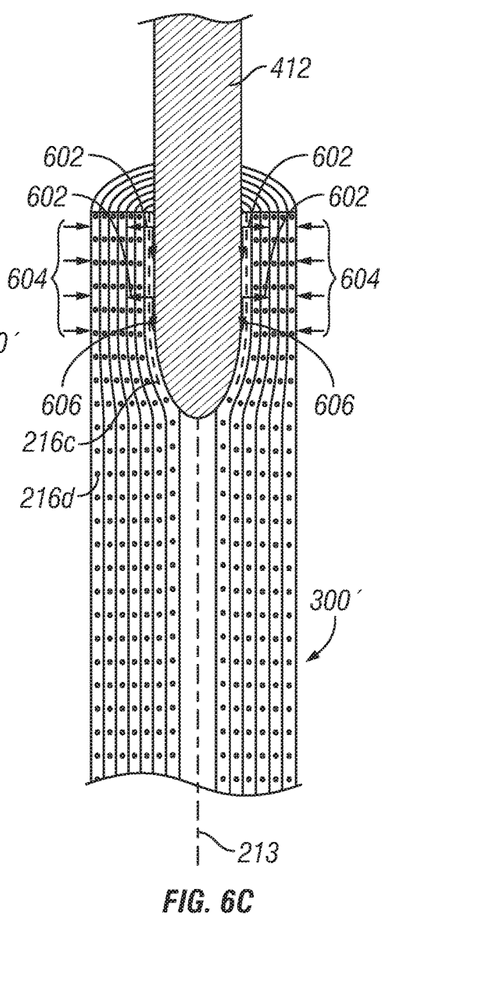

FIGS. 6*a*-6*c* illustrates the forces acting on a heated compression mold material maintained within a compression mold housing in accordance with an illustrative embodiment. The compression mold housing has been omitted for clarity; however, it should be noted that the exterior surface of the shaped compression mold material 300 is surrounded on all sides by the interior surface of a compression mold cavity. In FIG. 6*a*, the expansion member 412 is aligned with the central axis 213 of the shaped compression mold material 300. At this time in the molding process, the shaped compression mold material 300 has been exposed to heat to form a heated compression mold material 300', which facilitates interlayer bonding. In FIG. 6*b*, the expansion member 412 is extended partially through the heated compression mold material 300' along the central axis 213. The forces acting on the heated compression mold material 300' are depicted in more detail in FIG. 6*c*, which is a cross-sectional view taken along line 6*c* in FIG. 6*b*. As the expansion member 412 is extended along the central axis 213, the outer surface of the expansion member 412 exerts a compressive force oriented radially outward, which is represented by arrows 602. At the same time, the interior surface 210 of the compression mold cavity exerts an equal compressive force oriented radially inward, which is represented by arrows 604. Additionally, as the expansion member 412 is extended through the heated compression mold material 300', the outer surface of the expansion member 412 exerts a shear force on the interior surface of the heated compression mold material 300', which is represented by arrows 606. As previously mentioned, the shear force realigns some of the fibers 216*c* in the direction of the central axis 213, represented by dashed lines. Fibers 216*d* that are still oriented circumferentially around the central axis 213 are represented by circles.

As the expansion member 412 is extended through the entire length of the compression mold, the entire interior surface of the heated compression mold material 300' is exposed to a shear force, at least realigning fibers in an innermost layer. Excess compression mold material is pushed out of the opposite end of the compression mold cavity, which prevents undesirable flashing that reduces the strength of the finished molded tool 200.

Figure 7:
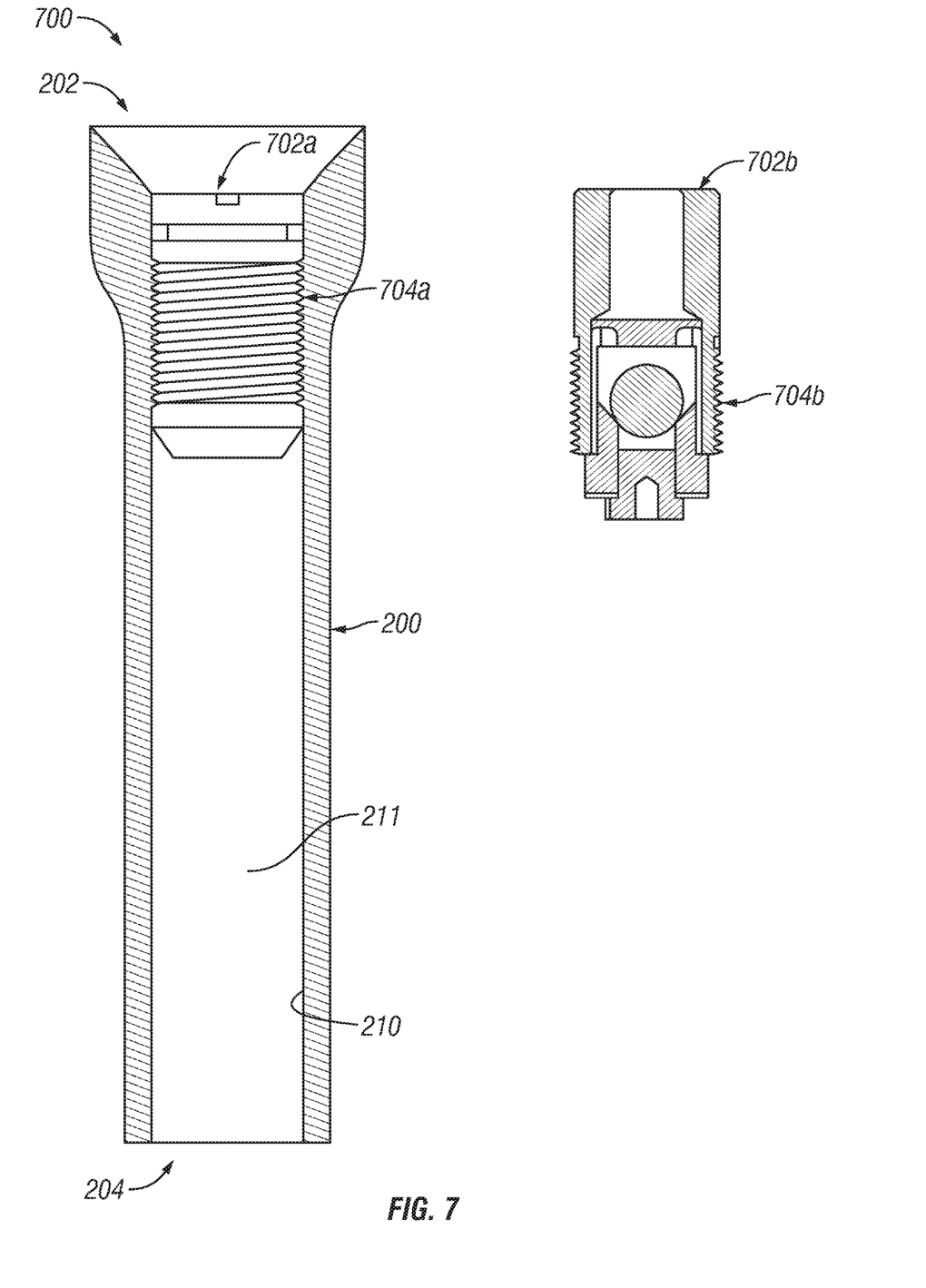
FIG. 7 is a wellbore tool in accordance with an illustrative embodiment.

FIG. 7 is a wellbore tool in accordance with an illustrative embodiment. For clarity the layers and the fiber orientation in the sidewall of the wellbore tool 700 are omitted; however, the layers and fiber orientation are arranged as shown in FIG. 2. The wellbore tool 700 includes a plugging element coupled to a first end 202 of the molded tool 200. In this illustrative embodiment, the plugging element is a bridge plug 702*a* configured to seal the central channel 211 extending longitudinally through the molded tool 200. The bridge plug 702*a* may be coupled to the first end 202 of the molded tool 200 by any conventional means but in this example the bridge plug 702*a* has external threads 704*a* around its exterior surface which mates with corresponding internal threads disposed about the interior surface 210 of the molded tool 200.

The bridge plug 702*a* can be replaced by a frac plug 702*b*, which is shown in cross-section to depict the ball and ball seat maintained therein. As is known in the art, the ball and ball seat in the frac plug 702*b* restrict the flow of fluid through the frac plug 702*b* to prevent backflow. Accordingly when the frac plug 702*b* is coupled with the molded tool 200, by external threads 704*b* in this illustrative embodiment, unidirectional fluid flow through the wellbore tool 700 can be achieved. Although FIG. 7 only depicts a frac plug 702*b* and a bridge plug 702*a* as exemplary plugging elements, the wellbore tool 700 can be configured to receive any other currently existing or later developed plugging elements.

Figure 8:
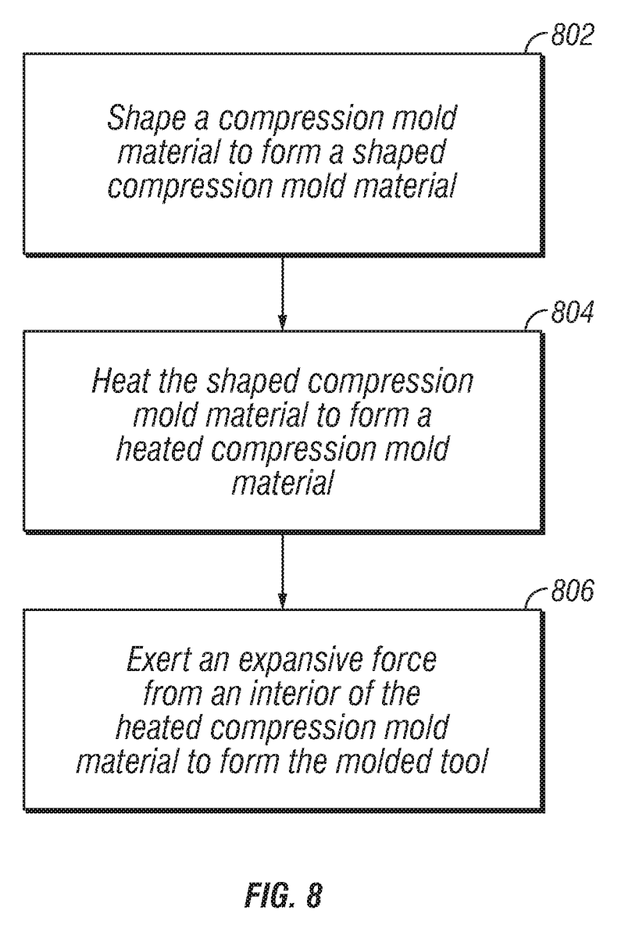
FIG. 8 is a high-level flowchart of a process for forming a molded tool in accordance with an illustrative embodiment.

FIG. 8 is a high-level flowchart of a process for forming a molded tool in accordance with an illustrative embodiment. The process may be used to form a molded tool 200 for use in downhole drilling operations, such as a mandrel. A compression mold material is shaped to form a shaped compression mold material (Step 802). In one embodiment, the shaped compression mold material is generally cylindrical with a geometry that defines a central axis extending through a length of the shaped compression mold material.

The shaped compression mold material is heated to form a heated compression mold material (Step 804). Thereafter, an expansive force is exerted within an interior of the heated compression mold material to form the molded tool (Step 806). In one embodiment, the expansive force expands the interior diameter of the heated compression mold material to achieve the diameter of the finished molded tool. The expansive force can include a shear force component with a directional vector oriented along the central axis. The expansive force can also include a compressive force component with a directional vector oriented radially outward.

In one embodiment, the expansive force is exerted down an entire length of the molded tool so that the entire interior surface of the molded tool is exposed to the expansive force. However, in another non-limiting embodiment, the expansive force is exerted down a partial length of the molded tool. The expansive force exerted within an interior of the heated compression mold material forms a molded tool with an interior surface having a greater strength than the exterior surface.

Figure 9:
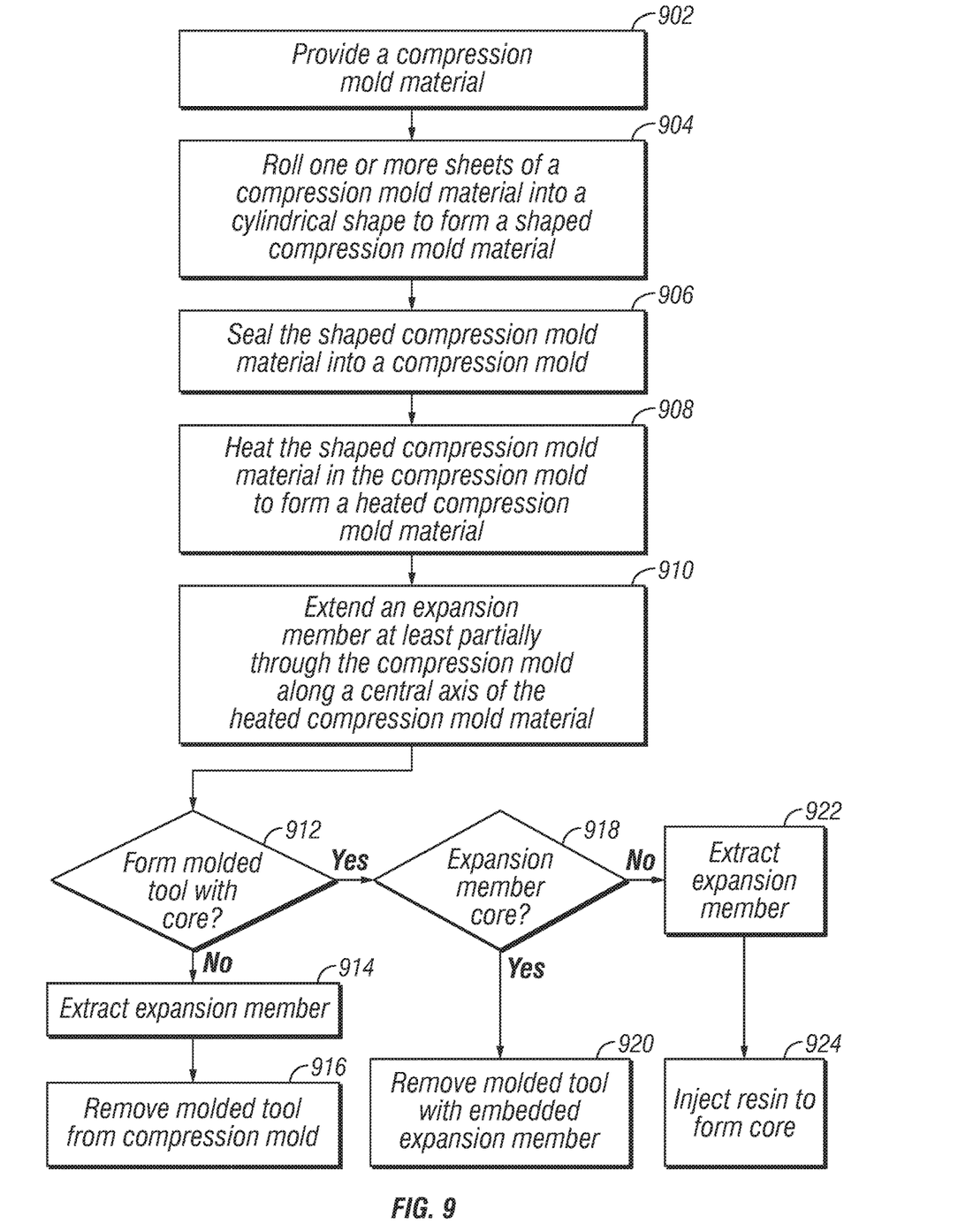
FIG. 9 is a flowchart of a process for forming a molded tool in accordance with a particular embodiment.

FIG. 9 is a flowchart of a particular process for forming a molded tool in accordance with an illustrative embodiment. In a first step, a compression mold material is provided (Step 902). The providing step may also include the optional step of selecting the type of compression mold material, the composition of the polymeric matrix, the fiber orientation.

In this illustrative embodiment in FIG. 9, the compression mold material is provided as one or more sheets of compression mold material. The one or more sheets of compression mold material is rolled into a cylindrical shape to form a shaped compression mold material (Step 904). Rolling the one or more sheets of the compression mold material results in the formation of a plurality of concentric layers of the compression mold material. The geometry of the shaped compression mold material defines a central axis extending through from a first end of the shaped compression mold material to a second end of the shaped compression mold material. The generally cylindrical shape may be substantially solid, or alternatively the generally cylindrical shape may be substantially solid but with a central channel extending throughout from a first end of the shaped compression mold material to a second end.

In another embodiment, the concentric layers of the compression mold material is formed from a plurality of sheets of compression mold material. Each sheet of the compression mold material may be formed from the same compression mold material so that the finished molded tool has homogenous layers, or the sheets may be formed from different compression mold material so that the finished molded tool comprises heterogeneous layers.

The shaped compression mold material is sealed into a compression mold, such as compression mold 400 in FIG. 4 or compression mold 500 in FIG. 5 (Step 906). In one embodiment, sealing the shaped compression mold material into the compression mold introduces a compressive force on the exterior surface of the shaped compression mold material. However, in another embodiment, the shaped compression mold material can be sealed into the compression mold without an externally applied compressive force, the compressive force introduced later when the expansive force is applied from an interior of the heated compression mold material.

The shaped compression mold material is heated in the compression mold to form a heated compression mold material (Step 908). An expansion member is extended at least partially through the heated compression mold along its central axis (Step 910). Extending the expansion member at least partially through the heated compression mold exerts an expansive force within an interior of the heated compression mold material. In one embodiment, a singular expansion tool is extended entirely through the compression mold; however, in another embodiment, the expansion tool is formed from a first member and a second member, each of which is inserted into opposite sides of the compression mold. The first member is inserted partially through the heated compression mold material in a first direction and along the central axis of the heated compression mold material, and the second member is inserted partially through the heated compression mold material in a second direction and along the central axis of the heated compression mold material, the second direction different than the first direction.

In either event, a decision is made as to whether the molded tool will be formed with a core (Step 912). If a decision is made that the molded tool will not be formed with a core, the expansion member is extracted (Step 914) and the molded tool is removed from the compression mold (Step 916).

Returning to Step 912, if a decision is made to form the molded tool with a core, then a subsequent decision is made as to whether the expansion member will serve as the core (Step 918). If a decision is made that the expansion member will serve as the core, then the molded tool is removed from the compression mold with the expansion member embedded therein (Step 920). However, if at step 918 a decision is made that the expansion member will not serve as the core, then the expansion member is extracted (Step 922) and a resin is injected into the molded tool to form the core (Step 924).

Additional Embodiments

The following paragraphs are offered as further description of various embodiments of the disclosed invention.

In a first embodiment, novel aspects of the present disclosure describe a method of forming a molded tool, an example of which is a mandrel used in drilling operations. The method comprises: shaping a compression mold material to form a shaped compression mold material, wherein the shaped compression mold material comprises a central axis extending through from a first end of the shaped compression mold material to a second end of the shaped compression mold material; heating the shaped compression mold material to form a heated compression mold material; and exerting an expansive force within an interior of the heated compression mold material to form the molded tool, wherein the expansive force includes a directional vector along the central axis.

In another aspect of the first embodiment, the method comprises: shaping a compression mold material to form a shaped compression mold material, wherein the shaped compression mold material comprises a central axis extending through from a first end of the shaped compression mold material to a second end of the shaped compression mold material; heating the shaped compression mold material to form a heated compression mold material; and exerting an expansive force within an interior of the heated compression mold material to form the molded tool, wherein the expansive force includes a directional vector along the central axis; and any one or more limitations selected from the following list:

sealing the shaped compression mold material into a compression mold;

wherein the shaped compression mold material is generally cylindrical, and wherein the compression mold material is one or more planar sheets, the forming step further comprises: rolling the one or more planar sheets of the compression mold material into a generally cylindrical shape;

wherein the cylindrical shape comprises concentric layers of the compression mold material;

wherein the generally cylindrical shape is substantially solid;

wherein the generally cylindrical shape comprises a central channel that coincides with the central axis of the generally cylindrical shape;

wherein exerting the shear force from the interior of the heated compression mold material further comprises: extending an expansion member at least partially through the heated compression mold along the central axis of the heated compression mold material;

wherein extending the expansion member at least partially through the heated compression mold material further comprises: exerting a expansive force on an entirety of an interior surface of the heated compression mold material;

wherein the expansive force comprises a shear force exerted parallel to the central axis; wherein the expansion member comprises a bullet-nosed rod;

wherein the expansion member is a hydraulic punch;

wherein the expansion member comprises a first member and a second member, and wherein exerting the expansive force further comprises: inserting the first member partially through the heated compression mold material in a first direction and along the central axis of the heated compression mold material; inserting the second expansion member partially through the heated compression mold material in a second direction and along the central axis of the heated compression mold material; and wherein the first direction is different from the second direction;

wherein the expansion member is a bladder, and wherein exerting the expansive force further comprises: filling the bladder with a fluid;

wherein providing the compression mold material further comprises: surrounding the bladder with the compression mold material;

wherein the method further comprises: evacuating excess compression mold material from an end of the compression mold;

wherein the method further comprises: extracting the expansion member from the molded tool, wherein the molded tool comprises compressed sidewalls defining a cylindrical cavity oriented along the central axis;

wherein the method further comprises: injecting a resin into the cylindrical cavity of the molded tool;

wherein the method further comprises: removing the molded tool from the compression mold with the expansion member at least partially embedded within the molded tool;

wherein exerting the expansive force from the interior of the heated compression mold material further comprises: pre-loading at least a portion of fibers of the heated compression mold material with a tensile force;

coupling a plugging element to one end of the molded tool;

wherein coupling the plugging element to one end of the molded tool further comprises threading an end of the molded tool; and wherein the plugging element is a frac plug or a bridge plug.

In a second embodiment, novel aspects of the present disclosure describe a molded tool comprising: a first end; a second end separated from the first end by a sidewall formed from a heat-sensitive polymeric matrix; wherein the sidewall comprises an interior surface with a first strength and an exterior surface with a second strength, and wherein the first strength is higher than the second strength.

In another aspect of the second embodiment, novel aspects of the present disclosure describe a molded tool comprising: a first end; a second end separated from the first end by a sidewall formed from a heat-sensitive polymeric matrix; wherein the sidewall comprises an interior surface with a first strength and an exterior surface with a second strength, and wherein the first strength is higher than the second strength; and any one or more limitations selected from the following list:

wherein the heat-sensitive polymeric matrix is a thermoset polymer;

wherein the heat-sensitive polymeric matrix is a thermoplastic polymer;

wherein the heat-sensitive polymeric matrix comprises at least one of nylon, epoxy, phenolic resin, polyphenylene sulfide, and polyether ether ketone;

wherein the sidewall comprises concentric layers of the heat-sensitive polymeric matrix;

wherein an interface between at least two of the layers of the heat sensitive polymeric matrix define a substantially uniform circumference;

wherein the heat-sensitive polymeric matrix comprises fibers;

wherein the fibers comprises one or more fiber types selected from Kevlar, fiberglass, and carbon;

wherein the fibers are randomly oriented;

wherein the fibers have a directional orientation;

wherein the directional orientation is a cross-fiber orientation;

wherein the directional orientation is a uni-directional orientation;

wherein the interior surface of the side comprises fibers pre-loaded with tension, and wherein the exterior surface comprises fibers pre-loaded with compression;

wherein the fibers pre-loaded with tension are aligned with a central axis of the molded tool, and wherein the fibers pre-loaded with compression are oriented circumferentially around the central axis;

wherein the molded tool lacks a part line;

wherein the molded tool further comprises a reinforcing central core;

wherein the tool further comprises a plugging element coupled to the first end of the molded tool; and wherein the plugging element is a frac plug or a bridge plug.

Although embodiments of the invention have been described with reference to several elements, any element described in the embodiments described herein are exemplary and can be omitted, substituted, added, combined, or rearranged as applicable to form new embodiments. A skilled person, upon reading the present specification, would recognize that such additional embodiments are effectively disclosed herein. For example, where this disclosure describes characteristics, structure, size, shape, arrangement, or composition for an element or process for making or using an element or combination of elements, the characteristics, structure, size, shape, arrangement, or composition can also be incorporated into any other element or combination of elements, or process for making or using an element or combination of elements described herein to provide additional embodiments. For example, it should be understood that the method steps described herein are exemplary, and upon reading the present disclosure, a skilled person would understand that one or more method steps described herein can be combined, omitted, re-ordered, or substituted.

Additionally, where an embodiment is described herein as comprising some element or group of elements, additional embodiments can consist essentially of or consist of the element or group of elements. Also, although the open-ended term "comprises" is generally used herein, additional embodiments can be formed by substituting the terms "consisting essentially of" or "consisting of."

While this invention has been particularly shown and described with reference to preferred embodiments, it will be understood by those skilled in the art that various changes in form and detail may be made therein without departing from the spirit and scope of the invention. The inventors expect skilled artisans to employ such variations as appropriate, and the inventors intend the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

We claim:

1. A molded tool comprising:
    a first end;
    a second end separated from the first end by a sidewall formed from a heat-sensitive polymeric matrix; and
    the sidewall has an exterior surface and an interior surface, wherein the interior surface defines a hollow channel that extends between the first and second ends, wherein the interior surface has a first strength and the exterior surface has a second strength, and wherein the first strength is greater than the second strength, and
    wherein the interior surface of the sidewall comprises fibers pre-loaded with tension, and wherein the exterior surface comprises fibers pre-loaded with compression.

2. The molded tool of claim 1, wherein the heat-sensitive polymeric matrix is a thermoset polymer.

3. The molded tool of claim 1, wherein the heat-sensitive polymeric matrix is a thermoplastic polymer.

4. The molded tool of claim 1, wherein the sidewall comprises concentric layers of the heat-sensitive polymeric matrix.

5. The molded tool of claim 4, wherein an interface between at least two of the layers of the heat sensitive polymeric matrix define a substantially uniform circumference.

6. The molded tool of claim 1, wherein the heat-sensitive polymeric matrix comprises fibers.

7. The molded tool of claim 6, wherein the fibers are randomly oriented.

8. The molded tool of claim 6, wherein the fibers have a directional orientation.

9. The molded tool of claim 1, wherein the fibers pre-loaded with tension are aligned with a central axis of the molded tool, and wherein the fibers pre-loaded with compression are oriented circumferentially around the central axis.

10. The molded tool of claim 1, wherein the tool further comprises a plugging element coupled to the first end.

11. The molded tool of claim 10, wherein the plugging element is one of a frac plug or a bridge plug.

* * * * *